(No Model.)
J. CONNER.
PRESSURE INDICATOR FOR BOTTLING MACHINES.
No. 355,921. Patented Jan. 11, 1887.
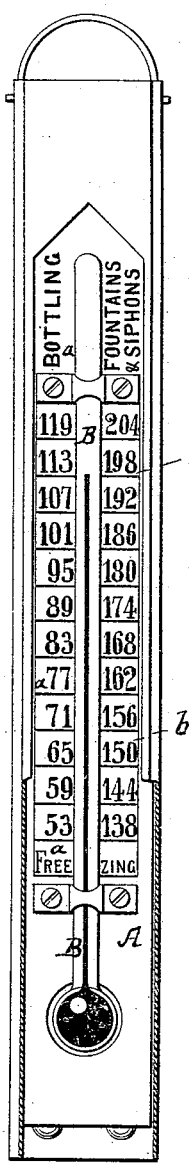
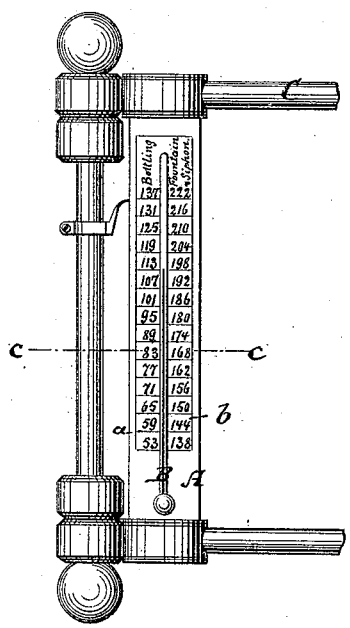
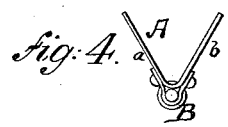
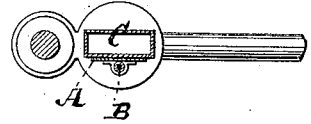
WITNESSES:
INVENTOR
Joseph Conner
BY
Breser & Steel
ATTORNEYS

UNITED STATES PATENT OFFICE.

JOSEPH CONNER, OF NEW YORK, N. Y., ASSIGNOR TO THE FIRM OF JOHN MATTHEWS, OF SAME PLACE.

PRESSURE-INDICATOR FOR BOTTLING-MACHINES.

SPECIFICATION forming part of Letters Patent No. 355,921, dated January 11, 1887.

Application filed March 13, 1886. Serial No. 195,059. (No model.)

*To all whom it may concern:*

Be it known that I, JOSEPH CONNER, of the city, county, and State of New York, have invented an Improved Pressure-Indicator for Bottling and other Machines, of which the following is a complete specification, reference being had to the accompanying drawings, in which—

Figures 1, 2, and 3 are side views of my improved pressure-indicator, showing different forms thereof. Fig. 4 is an end view of the form shown in Fig. 3; and Fig. 5 is a horizontal section on the line *c c*, Fig. 2.

This invention has for its object to produce an instrument by which the pressure required or intended for charging gaseous or other liquids into bottles or other vessels may be conveniently ascertained.

In bottling, charging of siphons, fountains, and the like with liquids which are to remain under pressure, the pressure which is to be applied varies in accordance with variations of temperature. In warm weather greater pressure must be used than in cold weather, because the heated gaseous liquids expand and require extra pressure to bring them into the required degree of density. Bottlers and the like must therefore be cautious to regulate the pressure in accordance with the variations in temperature to produce uniformity in the density of liquids.

My invention relates to an instrument which shall facilitate this regulation; and it consists, mainly, in combining a thermometer-tube showing temperature with a graduated scale showing the corresponding degrees of pressure.

In the drawings, the letter A represents a plate, of metal or other substance, to which is attached a suitable thermometer-tube, B. The face of the plate A has a graduated scale, *a*, which indicates the degrees of pressure. In bottling soda-water, for example, a pressure of about ninety-five pounds is required at a temperature of about 70° Fahrenheit; hence the scale *a* has the mark "95" in line with that part of the thermometer-tube which will contain the end of the mercury-column when the 70° are reached. Above that point the scale *a* contains higher figures and below it lower figures, as shown. Of course the figures may be as in the drawings or otherwise arranged so long as the degrees of pressure they indicate correspond with the degrees of temperature in manner stated. It is not necessary that the instrument be graduated to show the degrees of temperature. In fact, it is preferable not to show these, because the operator upon examining the instrument and the height of the mercury-column will observe the degrees of pressure needed, and this is all he wants. He need not know how warm or how cold it is. He only needs know what pressure to apply at any one moment.

The plate A may have two scales, *a* and *b*, one for the bottling-pressure, the other for the pressure required for charging siphons and fountains. The plate A may be flat, as in Figs. 1 and 2, or V-shaped, as in Figs. 3 and 4. The operator, if the instrument is detached, should dip it into the liquid to be bottled or charged to get the desired position of the mercury-column, or into some of that liquid drawn into a separate vessel. The instrument may be affixed, as in Figs. 2 and 5, to the pipe C, through which said liquid passes, or wherein the same is contained, so that the plate A may be a part of a wall of said pipe and get its temperature by contact of the liquid that traverses the same.

The glass tube C of bottlers' set-fountain, known as the "water-gage tube," affords a convenient place for this scale *a* to be placed, as it would be exposed to view in contact with the water charged, and may have the scale *a* marked upon it, or both scales *a* and *b*.

As to the thermometer-tube, the same may contain mercury, alcohol, or other fluid. The scale *a* may be on the thermometer tube itself.

I do not claim a graduated thermometer-tube which shows the degrees of temperature, nor a tube thus graduated placed on a pressure-indicating scale.

I claim—

The indicator for bottling-machines and the like, consisting of a thermometer-tube, B, and a graduated scale and adapted to be exposed to the same temperature as the machine, the scale being so graduated that the figures opposite the mercury-column at any point shall indicate the proper pressure in the machine corresponding to the temperature which raises the column to that height, as specified.

JOSEPH CONNER.

Witnesses:
C. G. M. THOMAS,
HARRY M. TURK.